Patented Mar. 6, 1945

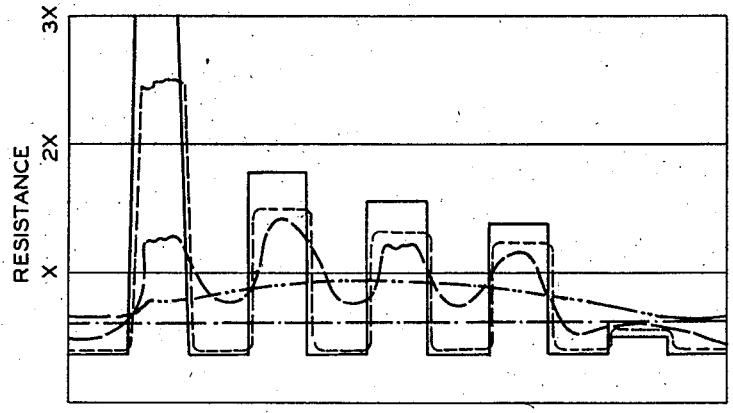
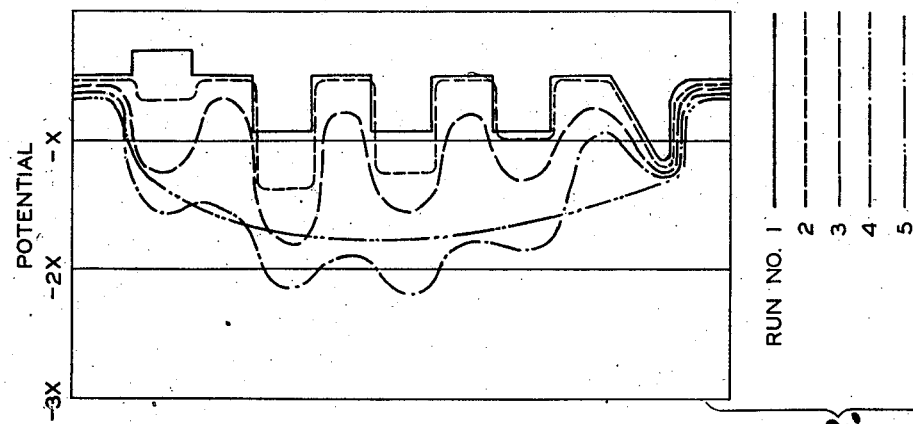
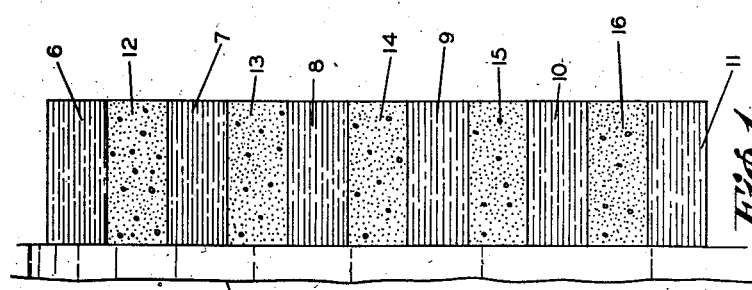
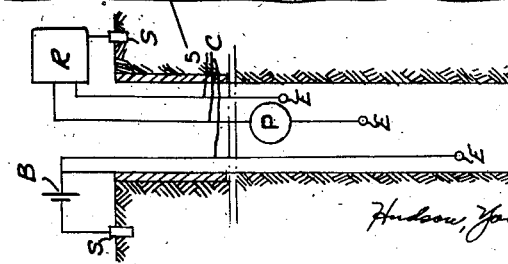

2,370,814

UNITED STATES PATENT OFFICE 2,370,814

METHOD OF WELL LOGGING

John A. Riise, Jr., Bartlesville, Okla., assignor to Phillips Petroleum Company, a corporation of Delaware Application June 26, 1941, Serial No. 399,929

6 Claims. (Cl. 175—182)

This invention relates to improvements in electrical well logging; more particularly it relates to improvements in the methods of electrical exploration of well bores.

Exploration of drill holes by electrical means has assumed considerable importance in drilling and production practice in the petroleum industry. The electrical properties of the earth formations surrounding the well bore forms the basis for correlation of geological formations. Various methods and apparatus have been devised for measuring the so-called "resistivity" and "self-potential" of the formations along the well bore. Electrical well logging service and records showing resistivity and self-potentials of wells logged are now commercially available. These records are known to the industry generally as "Schlumberger" well logs.

The electrical well log is generally made during or shortly after the drilling operations, with apparatus which makes electrical contact with the earth formation through the drilling fluid remaining in the hole as the result of rotary drilling. When used in old wells or in well bores drilled by other than rotary methods, the bore hole is usually filled with water or an aqueous solution to insure good electrical contact between the well logging electrodes and the formations surrounding the bore hole. Heretofore one round trip of the logging electrodes has been in most instances considered sufficient to obtain a good electrical well log. In some localities, where there is invasion of the drilling mud into porous formations, a so-called "third curve" based on resistance or impedance effects is made use of in an effort to discover the invaded areas. The "third curve" is recorded, usually on the same chart as the normal resistivity and self-potential curves, and is a modification of the normal resistivity curve. To obtain the "third curve" or "fourth curve," as it is sometimes called, the electrode spacing is increased to increase the effective depth of investigation of the electrical current. Experimental evidence indicates that the effective depth of investigation may be increased with increased spacing of the electrodes at a sacrifice of resolving power of the apparatus; i. e., the detail and sharpness of distinction between adjacent formations is decreased. The "third curve" sometimes fails to show the presence of thin formations indicated by other curves. There has also been some attempt to detect the presence of porous strata pierced by the bore hole by observation of the electrical potential resulting from flow of fluid into the porous strata. At low flow rates, these electrofiltration potentials are small compared with induced and naturally occurring potentials and are negligible.

While valuable information is gained by the conventional well logging methods, the interpretation of well logs so obtained is subject to some controversy. The conventional methods have achieved greatest success in the correlation of wells drilled by rotary drilling methods. In such wells, the logging conditions in any one locality are relatively uniform, the logs usually being made immediately after drilling of each well. In using electric logging to reveal information concerning the open hole below the casing in old producing wells, however, the conditions under which logging is conducted are not uniform and the electrical logs obtained have not been capable of definite correlation. Physical factors affecting the electrical properties in the open or uncased portion of the old wells vary widely even from well to well in the same locality.

By application of the present invention, satisfactory electric well logs may be made in old well bores. Not only is it possible to secure conventional electric logs which may be correlated, but additional information relative to the nature of the subsurface strata may also be obtained. I have found that the conventional electrode spacing used for self-potential and resistivity logs may be employed to indicate porous formations invaded by fluid from the bore hole if the conditions under which the invasion of fluid into the porous formations occurs are properly controlled. Briefly, the method of determining the porous areas comprises running fluid into the well bore until the static head equals or exceeds the formation pressure, controlling the fluid pressure in the bore hole, and taking a series of electrical logs immediately after introducing the fluid into the well bore. This is in contradistinction to conventional methods of taking a well log at an indefinite time and obtaining natural potential, normal resistivity, and "third curves" or "fourth curves" in an attempt to detect invaded porous formations. By the present invention the most efficient electrode spacing made be used to obtain all of the data.

An object of this invention is to provide an improved method of investigating well bores.

Another object of this invention is to provide an improved method of well logging which is especially applicable for use in logging old productive well bores.

Still another object of this invention is to provide an improved method of investigating well bores to ascertain certain physical characteristics of the earth strata penetrated by the well bores.

Still another object is to provide such a method which indicates the most permeable and least permeable strata penetrated by the well bores.

The present invention is especially useful for surveying old producing wells prior to or after reconditioning of the wells. In such wells the following pertinent information is obtainable by the proposed method.

1. The zones of different permeability.
2. Shale breaks.
3. Zones containing or producing free gas.
4. Zones having a high connate water content.
5. Zones from which the majority of the oil is being produced.
6. Quantitative measurements of permeability ranges.
7. The presence or absence of free salt in the formation adjacent the bore hole.
8. The pressures necessary to cause invasion of the fluid in the well bore into each porous formation.

The equipment necessary for use in carrying out the logging by the method of this invention is conventional and is well known in the art. Any standard three electrode logging device of commercial design with recording equipment may be used. No detailed description of such equipment is necessary or pertinent to the present invention. In addition to the well logging equipment, a recording pressure gauge of any suitable type is used and preferably is attached to the electrode assembly.

In the accompanying drawing,

Figure 1 is a vertical section through a portion of a well bore illustrating diagrammatically a hypothetical earth section at such a bore;

Figure 2 is a graph of the potential variations along this earth section for several runs taken under different conditions;

Figure 3 is a corresponding chart of the resistance variations for these runs; and Figure 4 is a vertical section through a well bore diagrammatically illustrating the apparatus used with the method herein disclosed.

Prior to logging the well bore, the well is cleaned out in conventional manner. The well bore is washed with water to remove substantially all soluble salts at the interface between the well bore and the formations. Then fresh water to which surface tension reducing agents, such as various alcohols including isopropyl alcohol, have been added is allowed to run into the hole to fill the portion in which electric logs are desired. The surface tension reducing agent serves two purposes, it allows the water to penetrate porous formations more readily and it facilitates removal of the water from the formation to allow oil production from the well after logging. Since the water introduced into the well bore will become contaminated with solids and liquids in the well bore, especially with soluble salts, it will be referred to throughout this disclosure as the logging fluid. Because of the contamination of the liquid introduced into the well bore and because the concentrations of electrolytes in water effect its conductivity, water for logging fluid is added to the well bore only immediately prior to logging. The static pressure of the column of logging fluid in the well bore may be controlled without effecting the salinity of the fluid by adding oil or other immiscible liquid thereto.

With reference to the figures, a hypothetical section of earth is shown adjacent to a well bore 5 in which electric logging is carried out. The earth section comprises several layers of nearly impervious shales 6, 7, 8, 9, 10 and 11 alternating with permeable "sands" 12, 13, 14, 15 and 16, each sand having different specific permeabilities. For illustrative purposes only, it will be assumed that although the permeability range in each sand is different from that in the other sands, the average porosity remains constant in all and is not below 12% or above 24%. Each sand will also be assumed to contain free salt deposited in the pores during prior production of the reservoir through the bore hole. Sand 16 represents a sand body with a low permeability, the void space of which is higher in connate water content than in any layer lying above it. The sand 15 represents a formation having a higher permeability than 16 and lower than 14. This formation contains normal percentages of water and oil. Sand 14 is more permeable than sand 15 and less permeable than sand 13. Sand 13 is a formation containing oil in which the specific permeability to the oil contained therein is greater than any of the lower sands. Sand 12 represents a formation in the hypothetical reservoir containing gas and having an actual permeability no greater than that of sand 13. However, since sand 12 represents a gas sand, the specific permeability to gas is greater than the specific permeability of sand 13 to the oil contained therein. Therefore, there is less resistance to natural fluid flow from the formation represented by sand 12 than from any other formation adjacent the well bore. Likewise sand 12 represents the path of least resistance to fluid movement into the reservoir when the pressure in the well bore exceeds the natural formation pressure.

In accordance with the present invention a quantity of water sufficient to cover the open formation, or uncased portion of the well bore, is introduced into the well bore and makes contact with the various earth strata. The apparatus used includes a series of electrodes E at the end of circuit wires in a cable C. One of the wires extends through a battery B to ground at the surface through a grounding stake S, while the other wires extend to any suitable form of measuring equipment for measuring the circuit potentials and the currents flowing therein, and including potentiometers and the like, all as well known in the art for controlling these factors. These circuits are properly grounded by means of stakes as shown. The current flows from the battery B through the grounded stake S and the ground to one electrode E and back to the current source, as is well known. Potentiometer and reading instruments measure the difference in potential produced by this current flow. The resistivity of the various strata may be deduced as hereinafter explained from the data obtained from this equipment. As shown, any suitable and well known form of recording pressure gauge P is attached to the cable assembly, as diagrammatically indicated in Figure 4. The well logging electrodes E make contact with the electrically conductive logging fluid comprising the water introduced into the well bore. The hydrostatic head of the fluid, measured by the recording pressure gauge P, will be considered to be lower than the formation pressure in sand 12 by an amount sufficient to allow production of gas from the formation during the period required for the first well log which is made immediately after introduction of the logging fluid. In accordance with the present invention, several other well logs are made in rapid succession, and changes in the hydrostatic head of the logging fluid are made between well logs and recorded on gauge P. The time factor is an important element in securing information relative to the porous formations after water encroachment begins.

With reference to the figure, the potential record or "self-potentials" and the resistance records for five successive well logs in the same well bore are illustrated for comparison. Run No. 1 represents an ideal electric log as it would be recorded if the electric log were made under the conditions described for each of the formations in the hypothetical reservoir of the figure. On the potential curve opposite the sand 12, the direction of the potential change is opposite to the change between the shales and the other sands. The reversal in direction opposite sand 12 is due to the electrofiltration potential caused by the flow of gas from sand 12 into the well bore. The high electrical resistance shown by the sand 12 on the resistance curve for run No. 1 is characteristic of a formation containing substantially dry gas. The sand 13, containing oil and some water has a somewhat lower electrical resistance, while the sand 16 with a high connate water content shows the lowest electrical resistance. It is assumed that during run No. 1 there is little if any production from any but the formation containing gas, sand 12, and that the hydrostatic head of the logging fluid is not sufficient to cause invasion of logging fluid into the porous formations.

After the completion of the first electrical log, designated as run No. 1, the hydrostatic head of the logging fluid is increased sufficiently to cause some invasion of the fluid into the formations. In practice, the hydrostatic head of the logging fluid may be increased without changing the concentration of the fluid by introducing oil into the well bore on top of the logging fluid. Since the path of least resistance to fluid flow is the gas sand 12, this formation takes the fluid more readily than the other formations, and the invasion is indicated by the decrease in resistance shown on the resistance curve of run No. 2. The potential curve also shows a change in potential, notably the reversal in direction of the potential change at the gas sand 12. Although the major change in the electrical properties takes place in the gas sand, some fluid enters the other sands altering their electrical properties. As the relatively fresh water of the logging fluid moves into the pore spaces in the sands it dissolves free crystalline salt deposited therein. The increase in the concentration of salt in the fluid in the pore spaces over that in the bore hole increases causing corresponding increases in the potential curve. Since salt water is less resistant to the passage of electrical current than any of the other natural well fluids, the infiltration of fluid into the porous formation is also reflected on the resistance curve.

After completion of the second well log, the hydrostatic head of logging fluid is again increased and recorded on gauge P, thereby forcing fluid into the porous formations in greater quantities and at a higher rate. From the well logs representing run No. 3, it is evident that the difference in electrolyte concentrations between the fluid invading the formation and the logging fluid in the well causes increases in the potential curves. The resistance curve opposite the porous strata shows a decrease, the change in resistance being greatest opposite the gas sand 12. This is due to the fact that under like conditions water replaces gas more readily than it replaces oil or the other well fluids. The lower viscosity and greater compressibility of the gas are partly responsible for its ease of displacement. The deviations in the record are less clearly defined than in run No. 1 and run No. 2, the curve becoming more rounded.

Run No. 4 represents a well log taken some time after the one represented by run No. 3 and under conditions of higher pressure in the well bore. The resistance curve No. 4 is fairly straight indicating that the fluid of the bore hole has penetrated all portions of all the permeable sections and that the electrical resistance of the formations at the effective depth of penetration of the electrical apparatus has been approximately equalized. The potential curve has continued to increase and continued to show less pronounced deviations.

After a certain quantity of the relatively fresh water or logging fluid from the well bore has penetrated into the porous formations all of the free crystalline salt in the formations dissolves and the concentrated salt solution so formed is displaced deeper into the formation by less concentrated fluid from the well bore. As the salinity of the fluid in the formation within measurable distance of the well bore decreases, the difference in concentration of salt ions between the formation fluid and the well bore fluid decreases and there is a general lowering of the potential curve. The more dilute solution within range of penetration of the electrical apparatus also results in an increase in the electrical resistance of the porous formations. Run No. 5 illustrates the decrease in potential and increase in resistance, or reversal of the effects shown by the previous runs, due to lowering of the salinity of the fluid contained in the porous formations within the range of the electrical apparatus.

If the hydrostatic head of the logging fluid is reduced to approximately that of the formation pressures in the well bore, a well log made immediately after run No. 5 will show relatively little other than two straight lines. It is evident that a conventional well log taken under conditions of run No. 5 or at some time thereafter will be of little or no value for interpretation. The change in the curves indicates the importance of taking a series of well logs in accordance with the present invention rather than relying on any one curve. The figure illustrates the importance of the time factor and how the curves change with time, the runs being a sequence in chronological order. A well log taken in accordance with conventional practice at an indefinite time might well correspond to any of the curves illustrated or even show less than the curves of run No. 5.

The curves corresponding to the sand 16 appear to be an anomaly. However, the curves represent accurately the results of experience with formations having a high connate water content. The changes in the curves opposite the sand 16 are less pronounced than those opposite the other sands, but are generally the same.

The pressure record obtained by the recording pressure gauge P associated with the logging electrode may be correlated with the electric logs on the basis of time. The conventional recording pressure gauge records pressure vs. time and the time basis may be used for correlating the pressure vs. depth of the gauge. The rate at which the logging fluid is entering the formation is determined by measuring the fluid level at intervals and calculating the volume entering the formation during the time interval. The fluid head should be increased during the test until all of the permeable formations are taking logging fluid as indicated by the electrical log. With the data obtained, quantitative calculations of the permeability ranges of the various sands may be made.

The rate of water entrance into the formation divided by the pressure at which the water enters the formation is directly proportional to the permeability of the formation. As the pressures are increased, from run to run, a point is reached at which the fluid begins to enter the formation. At this point the electric log shows a change opposite the formation or formations into which the fluid is entering. If the pressure is increased by small increments, a condition will be reached at which fluid will enter only the most permeable stratum to any appreciable extent. At the same time the pressure at the formation is recorded by the recording pressure gauge P. The measured drop in fluid head may be converted to barrels per hour of fluid entering the formation which is the over-all fluid rate at which fluid is entering the different permeable sections of the uncased portion of the well bore. The rates of entrance can be calculated for each pressure condition and the rates checked against the total quantity of fluid entering the formation during the test period. This furnishes information relative to the permeability of the formations. If the pressure conditions are so controlled that the logging fluid enters the permeable formations selectively, the specific permeabilities of the strata may be approximated by this method.

The curves illustrated in the figures represent electric logs taken in accordance with this invention in a formation containing free salt. In a formation containing salt water but no free salt, there is a decrease in the potentials and increase in the resistances recorded by the curves opposite the formations as the fluid enters. The dilution and displacement of the salt water in the formation by the relatively fresh water from the well bore decreases the potential and increases the resistances of the formation to the flow of electric current within the range of the apparatus. The movement of the curves under these conditions will be in a different direction than under the circumstances illustrated by the figures but the same fundamental principles apply in either instance.

As stated hereinbefore the electrode spacings are conventional but within the knowledge of those skilled in the art. They will be dependent on a number of variable factors such as the thickness of the formation and the degree of variation to be measured in each formation.

It is likewise clear to those skilled in the theory of electrical circuits that the effectiveness of the method herein disclosed depends primarily on the measurement of the changes in resistivity of the formation, although these changes will be affected to some extent, of course, by the resistivity and the variations therein of the fluid itself.

It is noted that the resistance opposite the impermeable shale formations in the later runs increases slightly. This is an observed fact for which no conclusive explanation can be safely given in view of the many variable factors involved. It is noted that the later runs 3, 4 and 5 are taken at later time intervals than the runs 1 and 2 which undoubtedly is one of the factors involving this observed result. However, there are many others such as the change in salinity of the fluid, the fact that the shale formations are only relatively impermeable, the dissolution of salts in the fluid in the penetrated formations, the deposit of salts on the bore surface which deposits will be of variable characteristics dependent upon the rate of flow of fluid into the formation, and the like. No completely satisfactory explanation of this observed change in resistance is therefore given especially since it is not a requisite to a full disclosure of the process herein claimed.

It will be apparent to those skilled in the art of exploration that the present invention provides an improved method for the exploration of well bores whereby information relative to the strata penetrated by the well bore, and not heretofore available, may be obtained. The word "sand" as used throughout this specification is to be taken in its broadest sense and is meant to include all permeable earth formations.

I claim:

1. The method of investigating earth formations surrounding the bore of a productive well comprising cleaning the well bore, introducing aqueous fluid containing surface tension reducing agents into the well bore until the hydrostatic head of the fluid is approximately equal to the formation pressure, electrically logging the uncased portion of the well bore at intervals thereafter, and increasing the hydrostatic head of the fluid prior to each logging.

2. The method of investigating earth formations surrounding a well bore to obtain indications of permeable sections thereof which comprises removing fluid from the well bore, introducing fresh water to the well bore until the hydraulic head is substantially equal to the formation pressure, electrically logging the well bore, increasing the hydraulic head by an amount sufficient to cause the water to permeate only the most permeable stratum, and determining the extent of the stratum by electrical logging.

3. The method of investigating earth formations surrounding a well bore to obtain indications of permeable sections thereof which comprises removing fluid from the well bore, introducing fresh water into the well bore until the hydrostatic head of the water is substantially equal to the formation pressure, electrically logging the well bore, introducing oil into the well bore to increase the hydrostatic head of the water without changing the electrical properties thereof, and electrically logging the well bore a second time.

4. In the reconditioning of productive wells, the method of investigating the earth formations surrounding the uncased portion of the well to obtain indications of permeable sections thereof which comprises removing fluid and water soluble salts from the well bore, introducing fresh water into the well bore until the hydrostatic head is substantially equal to the formation pressure, electrically logging the well bore, introducing oil into the well bore to increase the hydrostatic head of the water without changing the electrical properties thereof, and electrically logging the well bore a second time.

5. The method of investigating earth formations surrounding a well bore to obtain indications of permeable sections thereof which comprises replacing fluid in the well bore with a predetermined hydraulic head of fresh water containing surface tension reducing material, electrically logging the well bore immediately thereafter, increasing the pressure of the water in the well bore, and thereupon again electrically logging the well bore.

6. The method of investigating earth formations surrounding the bore of a productive well to obtain indications of permeable sections thereof which comprises cleaning the well bore to remove water soluble salts therefrom, introducing fresh water into the well bore until the hydraulic head thereof is substantially equal to the formation pressure, electrically logging the well bore immediately following the preceding step, increasing the hydraulic head, and electrically logging the well bore a second time.

JOHN A. RIISE, JR.